United States Patent [19]

Lin et al.

[11] Patent Number: 4,955,196
[45] Date of Patent: Sep. 11, 1990

[54] INTERNAL ENERGY ENGINE (IEE)

[75] Inventors: Zhichun Lin, 7-26, Weixing Road; Dongsheng Wang, both of Changchun, China

[73] Assignee: Zhichun Lin, China

[21] Appl. No.: 419,900

[22] Filed: Oct. 11, 1989

[30] Foreign Application Priority Data

Oct. 17, 1988 [CN] China .................. 88107240.0

[51] Int. Cl.$^5$ ............................. F03G 7/06
[52] U.S. Cl. ................................... 60/527
[58] Field of Search .................. 60/527, 528, 529

[56] References Cited

U.S. PATENT DOCUMENTS

| 4,041,706 | 8/1977 | White | 60/527 |
| 4,325,217 | 4/1982 | Golestaneh | 60/527 |
| 4,434,618 | 3/1984 | Dillon | 60/527 X |
| 4,503,676 | 3/1985 | Rutledge | 60/527 |

FOREIGN PATENT DOCUMENTS 48701 1/1987 Japan .................. 60/527

Primary Examiner—Allen M. Ostrager
Attorney, Agent, or Firm—Roylance, Abrams, Berdo & Goodman

[57] ABSTRACT

The invention internal energy engine is a power machine that makes use of the shape memory effect of shape memory alloy members. The member can be made from a Ni-Ti alloy, for example. It generates great force on a movable part when its transformation is constrained while undergoing temperature changes. The generated high pressure or high speed fluid working medium stream can be used for many practical functions, such as to drive a generator. An important advantage is using waste heat as the energy source. Thus using no fuel and creating no pollution.

13 Claims, 10 Drawing Sheets

INTERNAL ENERGY ENGINE (IEE)

INTRODUCTION

This invention relates to a motive power machine, i.e., an energy transformation mechanism. The invention operates to drive a motive part of the mechanism using a Shape Memory Alloy (SMA) part which has different shapes and sizes in its high temperature phase and in its low temperature phase. It is well known that an SMA part will change form easily when it is in its low temperature phase (i.e. the temperature is equal to or below a predetermined value). In other words, the SMA part is highly flexible when in its low temperature phase. Otherwise, the SMA part will recover its original shape automatically when it enters into its high temperature phase (i.e., the temperature is equal to or above another predetermined value). It will overcome resistance to recover even if it is constrained at the moment, and so it can do work by moving the movable parts of the IEE. The IEE presented here is a new kind of heat engine which uses these principles.

BACKGROUND OF THE INVENTION

For years, scientists all over the world have presented various approaches to heat engines where natural mechanical transformation caused by certain material's thermal shape memory effect does work. The constructions and principles are much the same, i.e. put a "U" shaped Ni-Ti alloy wire into cold water and then into hot water periodically, and convert the reciprocation due to the shrinkage and expansion of the alloy wire into rotation. The common features are to output the mechanical power of the transformation of the SMA directly. Because of its low cycle speed, high friction loss, low efficiency, complicated structure, and poor reliability, the spread and further development of such prior art devices has been restrained.

The present invention teaches an approach which converts the transformation on the material's thermal shape memory effect to fluid kinetic energy and/or pressure energy to drive a hydraulic turbine or cut materials, or the like. The purpose of the invention is to convert low level energy such as sunlight, the heat in waste water or vapor from power stations, and the like, to high level energy that can be used directly (e.g., high pressure and high speed fluid having the ability to drive a hydraulic turbine and the like).

SUMMARY OF THE INVENTION

The IEE of this invention uses a main part made of SMA which comprises a cylinder 3, a piston 6, SMA pipes or bars 4, a rebound spring 15, a compressed working medium container 21, a check pressure regulator valve 10, an admission valve 16, a pressure reducing valve 18, a hot fluid pump 13, a cool fluid pump 1, a working medium pump 20, and a working medium sump 28. Said cylinder 3 is divided into two parts (an upper part and a lower part) by piston 6 with the SMA pipes or bars 4 in the upper part. The SMA pipes or bars are mounted between the top of cylinder 3 and piston 6. The lower end of the upper part of the cylinder 3 is connected to an inverted conical compressed working medium container 21. A pressure check regulator valve 10 and a high pressure fluid outlet 9 are provided on the apex of container 21 and an admission valve 16 is provided on the side. The volume between the lower part of cylinder 3 below the piston 6, and above compressed working medium container 21 is filled with an incompressible fluid (e.g. oil or water). The top of the cylinder 3 is flat-headed and is formed with a perforation at the center out of which extends an inlet 14. One or more outlets 2 are provided on the top or in the side near the top of the cylinder 3. The compressed working medium contained 21 is mounted in the working medium sump 28. Hot (or cool) fluid which heats (or cools) the SMA pipes or bars 4 periodically pass from the inlet 14, through the SMA pipes or over the surface of these bars and out of the outlet 2. The hot (or cool) source may have a heating (or cooling) device to heat (or cool) the used hot fluid for recycling. In another case, the hot or cool fluid may simply be discharged. The fluid pump 13 and cool fluid pump 1 which heat and cool respectively the SMA pipes or bars 4 periodically, and the wording medium pump 20 are controlled by an electrical control assembly 24. The working medium pump 20 pumps the circulating working medium back to the working medium container 21. The working medium pump 20 connects to the admission valve 16 and the working medium pump 28 respectively. The rebound spring 15 is located below the piston 6 in the cylinder 3, with its upper end attached to the bottom of the piston 6 and with its lower end attached to the base of the inverted conical compressed working medium container 21. Between the working medium pump 20 and the admission valve 16 is the pressure reducing valve 18 which adjusts the flow of the fluid working medium in the compressed working medium container 21. The high pressure outlet 9 is connected to a pressurized tank 11 which is connected to a hydraulic device 12 to drive device 12.

The invention has several features of interest.

The SMA pipes or bars 4 of the invention IEE can take the form of a spiral spring that is longer than (or equal to) three straight rods. One end of the spiral spring made of the SMA pipe 4 extends upwards along the longitudinal axis of said spiral spring out of the top of cylinder 3. It is heated (or cooled) by the fluid in the pipe, i.e., hot (or cool) fluid flowing inside the pipe in the cylinder 3. In another form, SMA bars 4 are heated (or cooled) by fluid in contact with the surface of the bars to heat (or cool) the SMA bars, i.e., the hot fluid or cool fluid flows over the outside of the bars in the cylinder 3. In this second case, heat insulation material should be provided on the internal surfaces of the cylinder 3 and the surface of the tapered top of the piston 6 when an "I" shaped sharp-headed piston is used.

The piston 6 of the invention IEE may be flat-headed (see FIG. 1) or "I" shaped with a tapered head (see FIG. 10). In the latter case, heat-insulation material should be provided on the tapered head.

In the IEE of this invention the parts 4 are made of a kind of material (e.g. Ni-Ti alloy) which transforms in response to temperature changes and are located between the top of the cylinder 3 and the piston 6. The SMA materials may take the form of a spiral spring or a bar (or other such forms), with one end fixed on the top of the cylinder 3 and the other on the piston 6 in the cylinder 3. The piston may be flat-headed or "I" shaped with a tapered head. The piston 6 together with the piston rings 7 seal the incompressible fluid working medium in the cylinder 3 and the compressed working medium container 21 which has the check pressure regulator valve 10. The working medium pump 20 is connected to the admission valve 10. The working medium pump 20 is connected to the admission valve 16 and the working medium sump 28 respectively. There is a pressure reducing valve 18 which connects to the working medium sump 28 between the working medium pump 20 and the admission valve 16.

The operating procedures of the invention IEE are: heat and cool the SMA pipes or bars respectively to cause the pipes or bars to transform is to thus force the pistons 6 to reciprocate in the cylinder. When they are heated to a certain temperature by the hot fluid injected from the inlet 14, the SMA pipes or bars will extend and recover to their original shape to thus push the piston 6 down and compress the incompressible fluid (e.g., oil or water) in the cylinder 3 and compressed working medium container 21. Thus, the pressure of the incompressible fluid is increased. The check pressure regulator valve 10 will open when the pressure is above a certain value. The compressed high pressure fluid working medium (e.g., oil or water) enters the pressurized tank 11 through the high pressure fluid outlet 9 so as to drive hydraulic driving equipment 12. When cool fluid rather than hot fluid enters through the inlet 14 under the control of the electrical control assembly 24, the SMA pipes or bars 4 are cooled and the temperature decreases. As the temperature becomes equal to or goes below a certain level, the SMA parts become flexible. The piston 6 is pushed up by rebound spring 15 to compress the SMA pipes or bars 4, and the fluid working medium is pumped in to the compressed working medium container 21 by the working medium pump 20. If too much fluid working medium is pumped into cylinder 3 by the working medium pump 20, it will be conducted to the working medium sump 28 through the pressure reducing valve 18. When the SMA pipes or bars are compressed to their predetermined size and shape, the above procedures repeat, i.e., the injection of hot fluid to make the SMA pipes or bars 4 extend and push the piston 6 down, etc.

When the SMA pipes or bars cool to the temperature of the cool fluid and become flexible sufficiently rapidly that just the rebound spring 15 is enough to push the piston 6 up, the invention IEE can operate normally with the working medium pump 20 and the check pressure valve 18 removed. In this case, the working medium will be sucked into the compressed working medium container 21 through the piping and through the admission valve 16 when the piston 3 moves up under the drive force of the rebound spring 15.

The pressurized tank 11 may be used to drive various hydraulic machines, e.g., a turbine to produce electricity, or to cut materials when fitted to a jet nozzle, or be used as the motive power for impact work. The hot fluid pump 13 and the cool fluid pump 1, pumping the hot and cool fluids to the SMA parts respectively, and the working medium pump 20 pumping compensating fluid to the compressed working medium container 21, are all controlled by the electrical control assembly 24, as required. The invention has the following advantages:

1. It produces output power or motion without fuel pollution. It works on temperature differences and has this essential difference from other kinds of engines consuming fuel and oxygen, such as internal combustion engines.

2. Utilization of low temperature waste heat. According to statistics, low temperature waste heat accounts for more than two-thirds of the total consumed energy in factories even in developed industrial countries. Unlike other motive power machines, the invention IEE may use waste water such as cooling water from power stations, metallurgy factories, chemical plants, and nuclear reactors, hot ground water, and surface seawater (the difference in temperature between surface water and deeper water in the sea may be great as 20° centigrade).

3. Simple construction and low manufacturing cost as compared to other kinds of engines.

4. Long useful life of Ni-Ti alloy. Usually, fatigue, creep or flexure may not occur even after operating hundreds of thousands of times, if the maximum strain does not exceed a certain limit.

BRIEF DESCRIPTION OF THE DRAWING

All of the various features and advantages of the invention will become clear and will present themselves from this detailed description when read in conjunction with the drawing also forming a part of this disclosure, and in which.

DETAILED DESCRIPTION OF THE PREFERRED EMBODIMENTS

Figure 1:
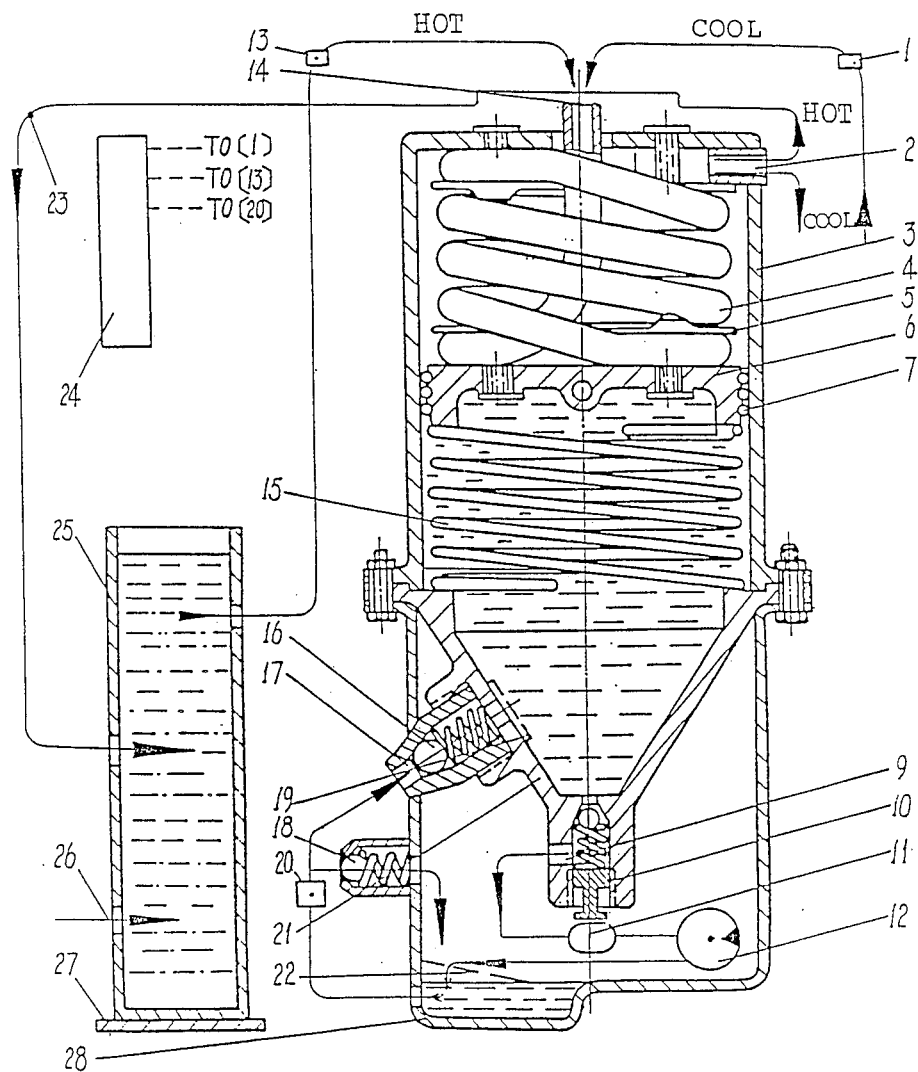
FIG. 1 is a schematic drawing of one form of the invention IEE using a flat-headed piston and a Ni-Ti alloy spring pipe.

In FIG. 1, 1 is cool fluid pump, 2 is the outlet, 3 is the cylinder, 4 is the SMA spring pipes, 5 is a spring clamp, 6 is the piston, 7 are the piston rings, 8 is the heat-insulation layer, 9 is the high pressure fluid outlet, 10 is the check pressure regulator valve, 11 is the pressurized tank, 12 is a hydraulic driving device, 13 is a hot fluid pump, 14 is the inlet, 15 is the rebound spring, 16 is the admission valve, 17 is the fluid working medium inlet, 18 is the pressure reducing valve, 19 and 22 are filter screens, 20 is the working medium pump, 21 is the compressed working medium container, 23 is a fluid circulating pipe, 24 is the electrical control assembly, 25 is the fluid reservoir, 26 is the fluid compensating pipe, 27 is the heat preserving device, and 28 is the working medium sump.

OPERATION-FIRST EMBODIMENT

Figure 2:
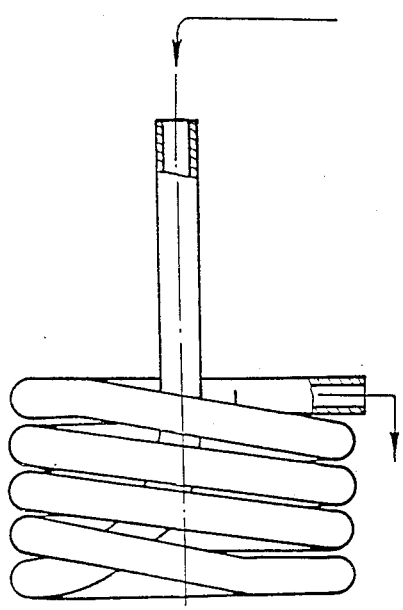
FIG. 2 and FIG. 4 are front views of the memorized shapes of the Ni-Ti alloy member in the form of a spring pipe, i.e. SMA spring pipe 4 operating in the structure illustrated in FIG. 1, shown in the low temperature phase and the high temperature phase, respectively.
Figure 3:
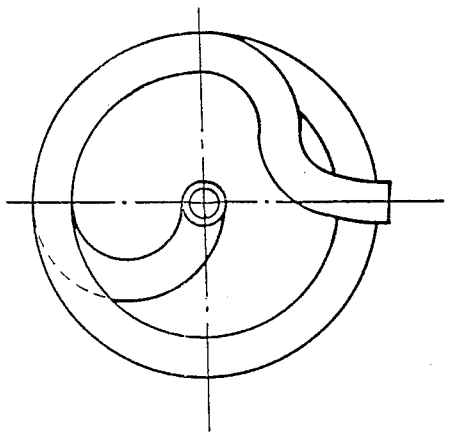
FIG. 3 is a top plan view of the SMA spring pipe while in the FIG. 2 condition.
Figure 4:
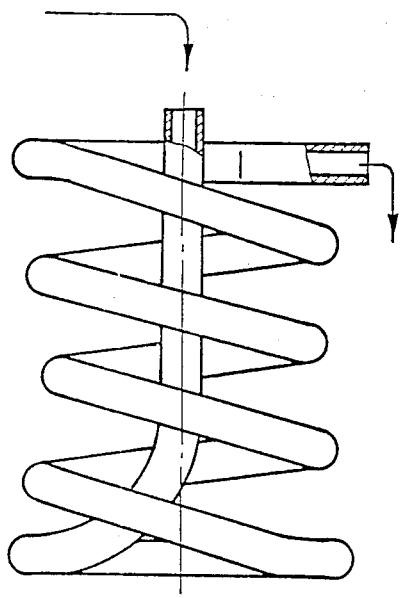
Figure 5:
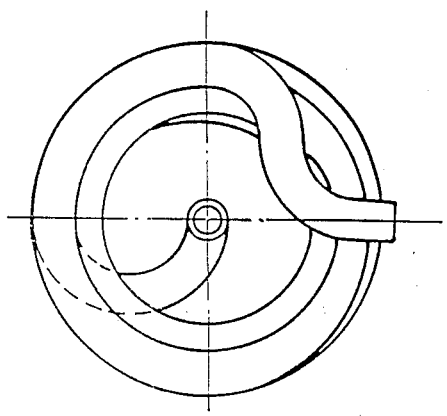
FIG. 5 is a top plan view of the SMA spring pipe while in the FIG. 4 condition.
Figure 6:
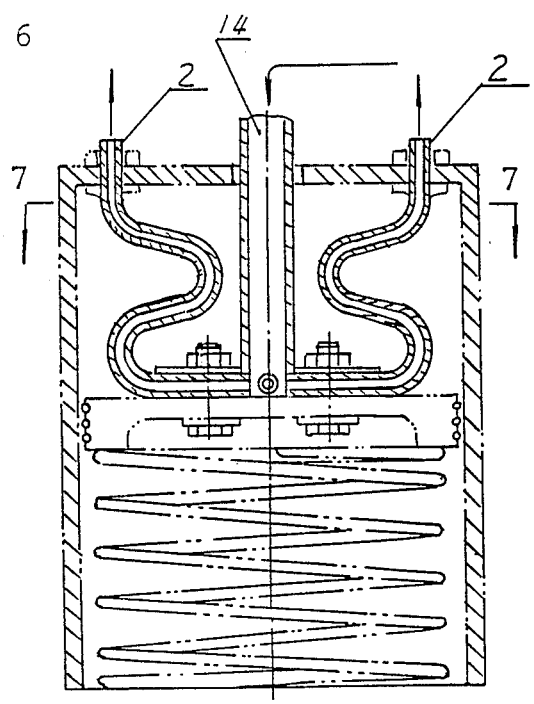
FIG. 6 and FIG. 8 are schematic front views of the memorized shapes of the Ni-Ti alloy number in the form of straight pipes, i.e. SMA bars 4 that may replace the Ni-Ti alloy spring pipe in the structure illustrated in FIG. 1, shown in the low temperature phase and the high temperature phase, respectively.
Figure 7:
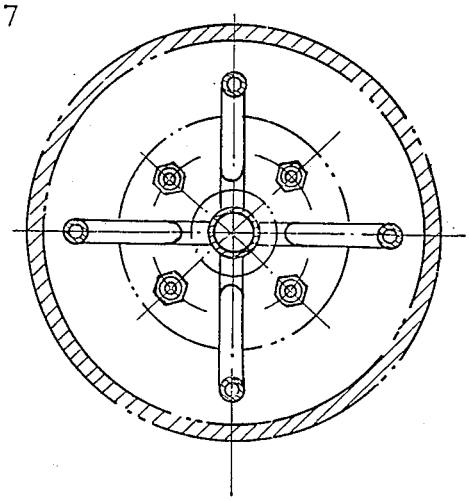
FIG. 7 is a cross-sectional view taken on line 7—7 of FIG. 6.
Figure 8:
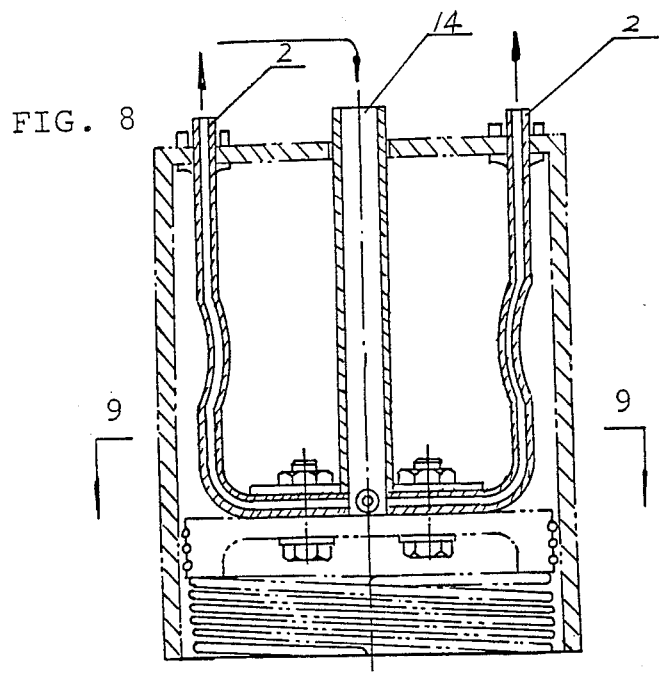
Figure 9:
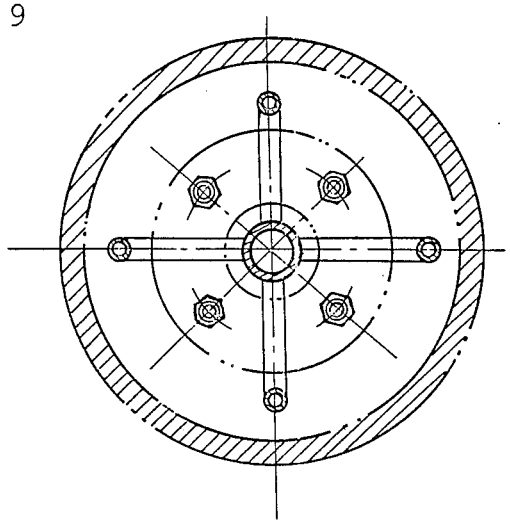
FIG. 9 is a cross-sectional view taken on line 9—9 of FIG. 8.
Figure 10:
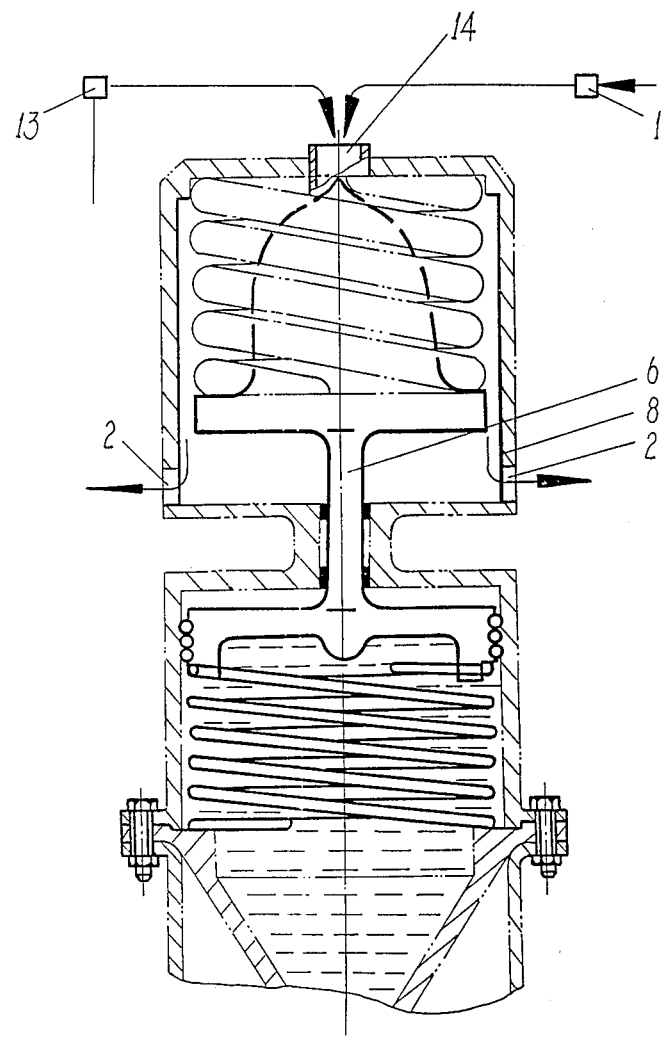
FIG. 10 is a schematic drawing similar to parts of FIG. 1 showing a modified structure of the invention IEE using an "I" shape with a tapered head piston and a Ni-Ti alloy solid spring.

In FIGS. 1–5, a Ni-Ti alloy spring pipe 4 with proper transformation parameters and memorized shapes in the low temperature phase and the high temperature phase according to the requirements of the specific operating temperatures and pressures has been selected. Spring 4 is placed between the top of cylinder 3 and piston 6. The upper and lower ends of the Ni-Ti alloy spring pipe 4 may be fixed on top of cylinder 3 and to piston 6, respectively. When cool fluid pump 1 pumps cool fluid into the Ni-Ti alloy pipe 4 from the inlet 14 and out of the outlet 2, the Ni-Ti alloy spring pipe 4 reaches its lower transition temperature and becomes soft and easy to transform. Working medium pump 20 pumps the fluid working medium passed through filter screen 19 from fluid working medium inlet 17 and admission valve 16 into the lower part of the compressed working medium container 21 and the lower part of cylinder 3. Then the piston 6 moves up to the upper limit position not only by pressure of the fluid working medium, but also by the force of the rebound spring 15. The straight part of inlet 14 of the Ni-Ti alloy spring pipe 4 extends through the round hole in the top cover of cylinder 3. The final shape at the end of the low temperature phase is illustrated in FIG. 2, i.e., the spring pipe is shrunk. If the shrinkage of the Ni-Ti alloy spring pipe 4 above piston 6 in the processes mentioned above is slow while the volume flow of the fluid working medium below the piston 6 increases too fast, the pressure reducing valve 18 will open automatically at a predetermined pressure to allow the fluid working medium to return to the working medium sump 28 to avoid further increase in pressure. When the speed of shrinkage of the Ni-Ti alloy spring pipe 4 matches the force beneath the piston 6, the pressure reducing valve 18 will close automatically and allow the fluid working medium to be pumped into the compressed working medium container 21 through admission valve 16. The purpose of this manner of operation of this part of the invention including the valves 16 and 18 is to synchronize the operation of the different parts of the IEE.

After the Ni-Ti alloy spring pipe 4 reaches the upper limit position at the top of the cylinder 3, the electrical control assembly 24 immediately stops the cool fluid pump 1 and the working medium pump 20, and starts the hot fluid pump 13. The hot fluid rapidly heats the Ni-Ti alloy pipe 4 by passing through it. Since it hardens and extends as it is heated to the upper transition temperature of its shape memory effect, the Ni-Ti alloy spring pipe 4 generates great force on the top of the piston because its transformation is constrained. This extension of member 4 also forces piston 6 downwardly which compresses the incompressible fluid working medium. When its pressure reaches a predetermined value, the fluid working medium pushes away the ball to open pressure check regulator valve 10 at this predetermined pressure. Then a jet of high pressure fluid is forced out of the high pressure fluid outlet 9 into pressurized tank 11 for use in doing work such as in hydraulic devices 12. This continues until the piston 6 reaches its low limit position and finishes a cycle, at which time the Ni-Ti alloy spring pipe 4 is in the configuration of its high temperature phase (see FIG. 4). Next, the electrical control assembly 24 stops the hot fluid pump 13, starts the cool fluid pump 1 and working medium pump 20, and a new cycle begins.

The fluid streams in fluid circulating pipe 23 and fluid compensating pipe 26 may be controlled by electrical control assembly 24 through another pump, not shown, if desired. They may also flow by gravity. The fluid working medium is circulated to the working medium sump 28 through filter screen 22. Whether or not to circulate the heating fluid and the cooling fluid is decided depending upon the circumstances of the particular embodiment and application of the invention. The quantity of fluid in fluid reservoir 25 must be sufficient for normal operation of the engine; it is compensated automatically through fluid compensating pipe 26 when needed using ordinary means to do so, as is known to those skilled in these arts.

SECOND EMBODIMENT

FIGS. 6 to 9 are schematic drawings of the structure of the second embodiment. In the second embodiment, the SMA pipe 4 takes the form of a straight pipe instead of a spiral spring pipe of FIGS. 1–5, and which is preshaped to bend in a direction transverse to its length. Three or more such Ni-Ti alloy straight pipes 4 are needed. One respective end of all of them are distributed symmetrically on the top of the piston 6 and they are all connected to a fluid input pipe at the center of the cylinder 3 (see FIG. 6), so that the fluid entering from the fluid input pipe may heat or cool the straight Ni-Ti alloy pipes immediately and evenly. All of the other respective ends are joined with the fluid output pipes on the top of the cylinder. Said fluid input pipe passes in through the center hole at the upper face of the cylinder. The structure, principles and operating procedures are the same or analogous to those described above in regard to the first embodiment.

THIRD EMBODIMENT

Figure 11:
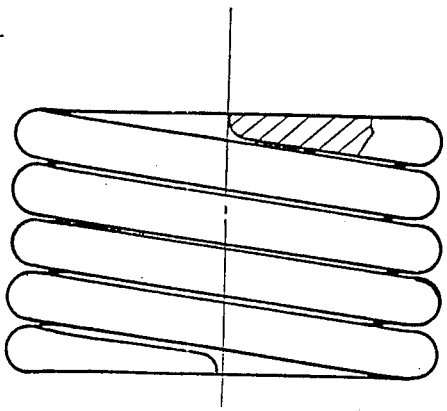
FIG. 11 and FIG. 13 are front views of the memorized shapes of a Ni-Ti alloy solid spring shown in the structure illustrated in FIG. 10, in the low temperature phase and the high temperature phase, respectively.
Figure 12:
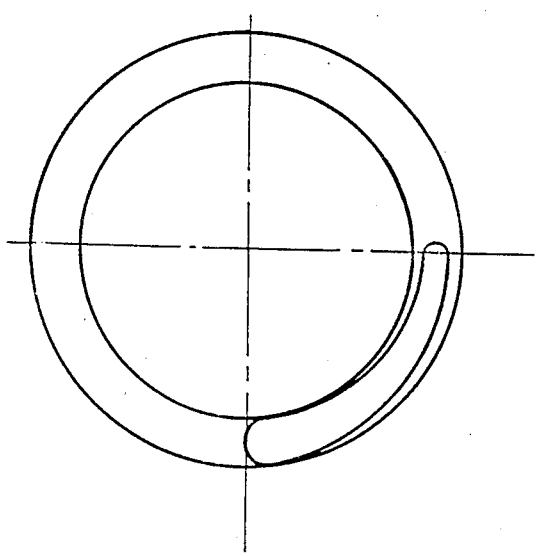
FIG. 12 is a plan view of the solid spring of FIG. 10 shown in the FIG. 11 condition.
Figure 13:
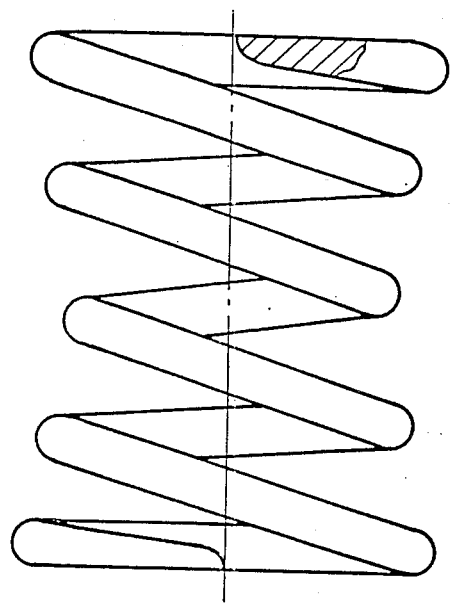
Figure 14:
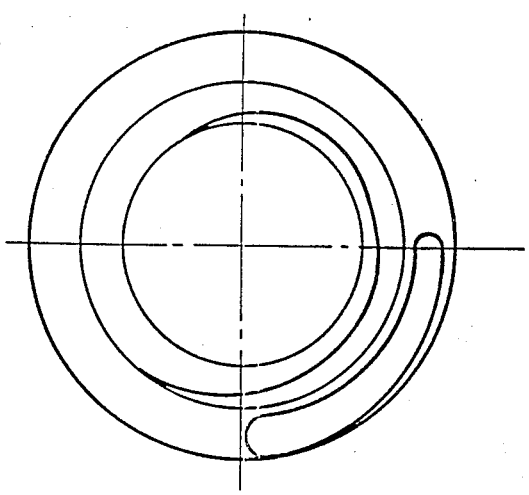
FIG. 14 is a plan view of the solid spring of FIG. 10 shown in the FIG. 13 condition.

FIGS. 10 to 14 illustrate another embodiment of the invention. The feature here is that the SMA bar 4 is a solid Ni-Ti alloy spring, and the piston 6 is of a letter "I" shape. The piston 6 has a protruding head on which heat-insulation material is mounted and the Ni-Ti alloy spring is fixed. In the cylinder the connecting neck of piston 6 and seals (shown as black blocks and not numbered) are carefully arranged. In the center of the upper face of the cylinder is the fluid inlet 14, and the fluid outlets 2 are on the side of the upper part of the cylinder. Fluid for heating or cooling flows in through fluid inlet 14 and out through fluid outlets 2, and the springs, made from SMA, correspondingly are heated or cooled. The purpose of this arrangement is that the cooling or heating fluid shall flow radially and as symmetrically as possible. This is the reason the axis of the inlet 14 is in alignment with the sharp head. FIG. 11 and FIG. 13 show the memory shapes of the Ni-Ti alloy spring in the low temperature phase and the high temperature phase respectively, and FIG. 12 and FIG. 14 are corresponding plan views. The operating procedures and principles are the same or analogous to those described above in regard to the first embodiment.

FOURTH EMBODIMENT

Figure 16:
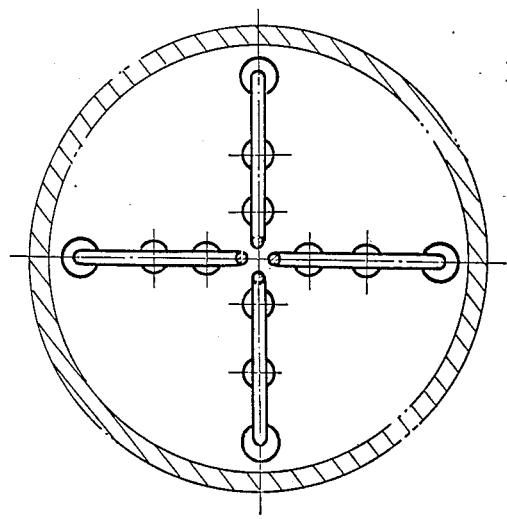
FIG. 16 is a cross-sectional view taken on line 16—16 of FIG. 15.
Figure 15:
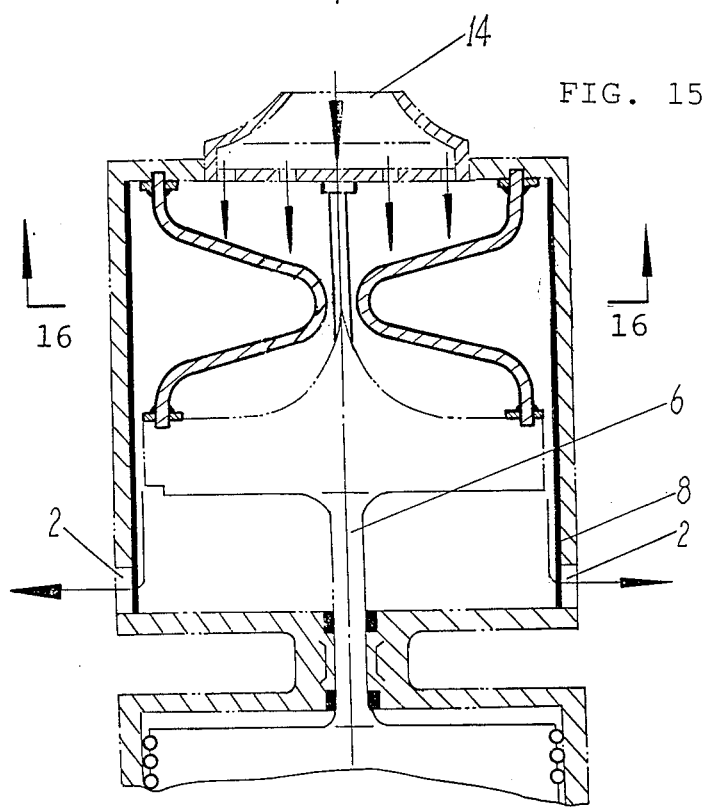
FIG. 15 and FIG. 17 are schematic front views similar to parts of FIG. 10 showing the memorized shapes of a Ni-Ti alloy members in the form of straight bars that might replace the Ni-Ti alloy spring in the structure in FIG. 10, shown in the low temperature phase and the high temperature phase respectively.
Figure 18:
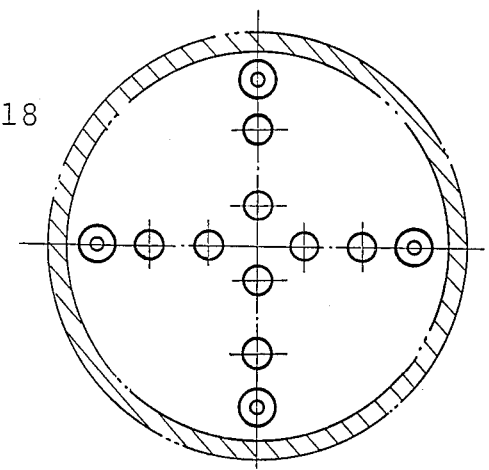
FIG. 18 is a cross-sectional view taken on line 18—18 of FIG. 17.
Figure 17:
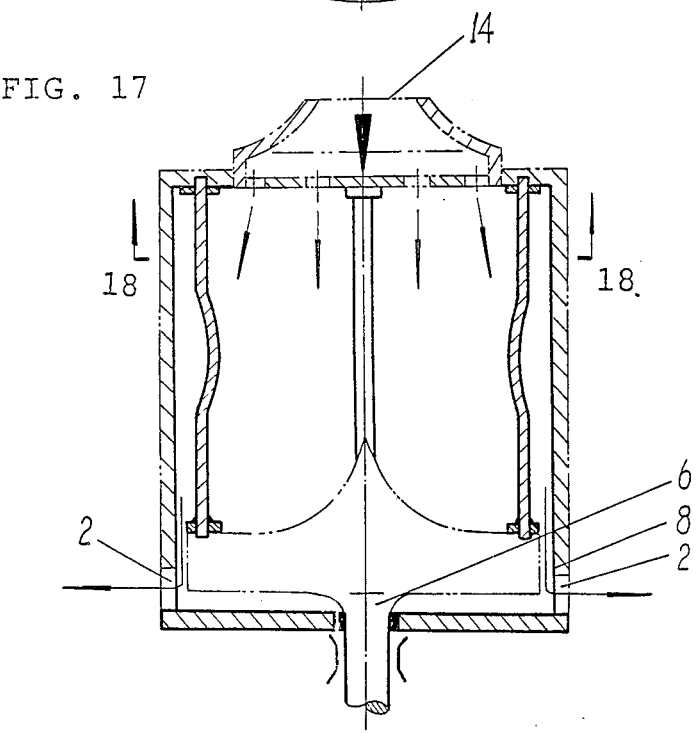

FIGS. 15 to 17 illustrate an IEE according to the invention which uses an "I" shaped sharp-headed piston and solid Ni-Ti alloy bars. The fluid flowing through the inlet 14 periodically heats and cools the Ni-Ti alloy bars 4 in the cylinder 3, which press on the piston 6 symmetrically, so that the Ni-Ti alloy bars transform periodically and force the piston to reciprocate in the cylinder. The fluid in the compressed working medium container 21 and in the lower part of the cylinder 3 is compressed. The structure, principles and operating procedures are the same or analogous to those described above in regard to the first embodiment.

In short the projects of the approach are more than those mentioned above. In embodiments 1 and 3, suppose d1 is the diameter of the Ni-Ti alloy spring pipe, and D is the inside diameter of the cylinder 3 then $$d1/D = 1/4 - 1/20$$

In embodiments 2 and 4, suppose d2 is the diameter of the straight Ni-Ti alloy pipe or bar, then $$d2/D = 1/15 - 1/100$$

where D is the inside diameter of the cylinder 3. For a given elastic force, the latter is affected by the number of bars. The diameter of the bars should be decreased as the number of bars increases.

In this invention, hot gas, solar energy, electricity and other forms of energy may be used in addition to hot and cool waste liquids. The pressure of the working medium may be determined as required. It is affected by the structure, the diameter of the cylinder, the performance, diameter and number of SMA parts, amplitude and frequency of the temperature change, etc. Generally speaking, the pressure of the working medium is high enough with the structure offered here for good performance. But, the above factors should be matched to ensure proper operation, or the pressure will be lower.

As mentioned above, the reciprocation of the piston in the invention IEE device produces a non-continuous high pressure or high speed fluid jet. Continuous or overlapped fluid jets may be obtained with a multi-cylinder engine according to the invention feeding into one pressurized tank like tank 11.

While the invention has been described in some detail above, it is to be understood that this detailed description is by way of example only, and that the scope of protection granted is to be limited only by the spirit of the invention and the scope of the following claims.

What is claimed is:

1. In an internal energy engine, the combination comprising cylinder means, said cylinder means comprising an upper end and a lower end, piston means fitted for reciprocating position within said cylinder means, temperature responsive means consisting essentially of SMA means fitted in said cylinder means between said upper end of said cylinder means and the upper end of said piston means, means to supply hot fluid to said cylinder means, means to supply cool fluid to said cylinder means, means to expose said SMA means to said hot and said cool fluids supplied to said cylinder means alternately, means to define a compressed working medium chamber in said cylinder means below said piston means and above said lower end of said cylinder means, means defining a working medium sump in the lower end of said cylinder means below said working medium chamber, check type admission valve means in said chamber defining means, working medium pump means arranged to pump working medium from said sump into said chamber via said admission valve means, said chamber defining means also comprising high pressure working medium outlet valve means, tank means for receiving the high pressure working medium from said outlet valve means; and means to flow said high pressure working medium from said tank means to a point of use of said high pressure working medium and thence back to said sump means.

2. The combination of claim 1, said working medium comprising an incompressible fluid.

3. The combination of claim 2, said working medium comprising water.

4. The combination of claim 2, working medium comprising hydraulic oil.

5. The combination of claim 1, and rebound spring means in said cylinder means below said piston means, one end of said spring means bearing against said piston means and the other end of said spring means bearing against a fixed portion of said cylinder means.

6. The combination of claim 1, said SMA means comprising a member having the form of a hollow spiral spring, said means to supply said hot and cool fluids and to expose said SMA member to said hot and cool fluid comprising hot and cool fluid pump means respectively, and means to flow said hot and cool fluids through the inside of said hollow spiral spring form SMA member.

7. The combination of claim 1, said SMA means comprising at least three shaped pipe members, said pipe members responding to said hot and cool fluids by bending transversely to their length and cycling between an extended condition and a bent condition to drive said piston means correspondingly, said means to supply said hot and cool fluids and to expose said SMA means to said hot and cool fluids comprising hot and cool fluid pump means respectively, and means to flow said hot and cool fluids through the inside of said pipe members.

8. The combination of claim 1, said SMA means comprising a member having the form of a solid spiral spring, said piston means and said cylinder means both having a letter "I" configuration, the upper part of said piston means being fitted into the upper part of said cylinder means, said means to supply said hot and cool fluids and to expose said SMA members to said hot and cool fluids comprising hot and cool fluid pump means respectively, and means to flow said hot and cool fluids over said solid spiral spring form SMA member.

9. The combination of claim 8, said means to supply hot and cool fluids to said SMA member comprising means to flow said fluids radially outwardly, evenly and symmetrically over said solid spiral spring form SMA member.

10. The combination of claim 1, and electronic control means for controlling said working medium pump means, said means to supply cool fluid, said means to supply hot fluid, and said means to supply said fluids to said cylinder means alternately.

11. The combination of claim 1, said means to define said chamber comprising a conical shaped member, said admission valve means being located in a side wall of said conical member, said outlet valve means being located in the apex portion of said conical member, and said apex portion being the portion of said conical member closest to said lower end of said cylinder means.

12. The combination of claim 1, and pressure reducing valve means located in said cylinder means and adapted to direct flow therethrough into said sump means, means to direct the output of said working medium pump means to both of said admission valve means and said pressure reducing valve means, and said admission valve means and said pressure reducing valve means being so arranged that the output of said pump means will be directed back to said sump means via said pressure reducing valve means when the pressure inside said chamber is at or above a predetermined value.

13. The combination of claim 1, said upper end of said cylinder means being formed with a central opening, and a portion of said SMA means extending through said central opening to the outside of said cylinder means.

* * * * *